United States Patent [19]
Hinrichs et al.

[11] Patent Number: 6,026,731
[45] Date of Patent: Feb. 22, 2000

[54] COMPRESSOR FOR AUTOMOTIVE AIR-CONDITIONING SYSTEM

[75] Inventors: Jan Hinrichs, Friedrichsdorf; Volker Seipel, Bensheim, both of Germany

[73] Assignee: Luk Fahrzeug-Hydraulik GmbH & Co. KG, Bad Homburg, Germany

[21] Appl. No.: 09/126,015

[22] Filed: Jul. 29, 1998

[30] Foreign Application Priority Data

Jul. 29, 1997 [DE] Germany .............. 197 32 609

[51] Int. Cl.[7] .................................... F01B 13/04
[52] U.S. Cl. .................. 92/12.2; 92/57; 92/71; 417/269
[58] Field of Search .................. 417/269; 92/12.2, 92/57, 269.1, 71

[56] References Cited

U.S. PATENT DOCUMENTS

| | | | |
|---|---|---|---|
| 3,643,727 | 2/1972 | Longoni et al. | 164/76 |
| 4,063,847 | 12/1977 | Simmons | 415/200 |
| 4,484,449 | 11/1984 | Muench | 417/12 X |
| 4,614,481 | 9/1986 | Vanderjagt | 417/270 |
| 4,800,801 | 1/1989 | Van Zweeden | 417/269 X |
| 4,831,861 | 5/1989 | Hofmann et al. | 72/354 |
| 5,307,731 | 5/1994 | Chamberlain et al. | 417/269 X |
| 5,317,579 | 5/1994 | Adsett | 417/372 X |
| 5,342,178 | 8/1994 | Kimura et al. | 417/269 |
| 5,392,670 | 2/1995 | Hauser | 74/606 R |
| 5,456,581 | 10/1995 | Jokela et al. | 417/270 X |
| 5,554,008 | 9/1996 | Porel | 417/269 |

*Primary Examiner*—Hoang Nguyen
*Attorney, Agent, or Firm*—Alston & Bird LLP

[57] ABSTRACT

A compressor, which is adapted for use in an air-conditioning system of a motor vehicle, having a housing (2) and a compressor unit (1) arranged in the housing (2) for drawing in and compressing a coolant. The structural size of the compressor is reduced, while sufficient compressor capacity is ensured, as a result of manufacturing the housing (2) from a high-strength material and using a gas that has a high density even in the drawn-in state as the coolant.

6 Claims, 1 Drawing Sheet

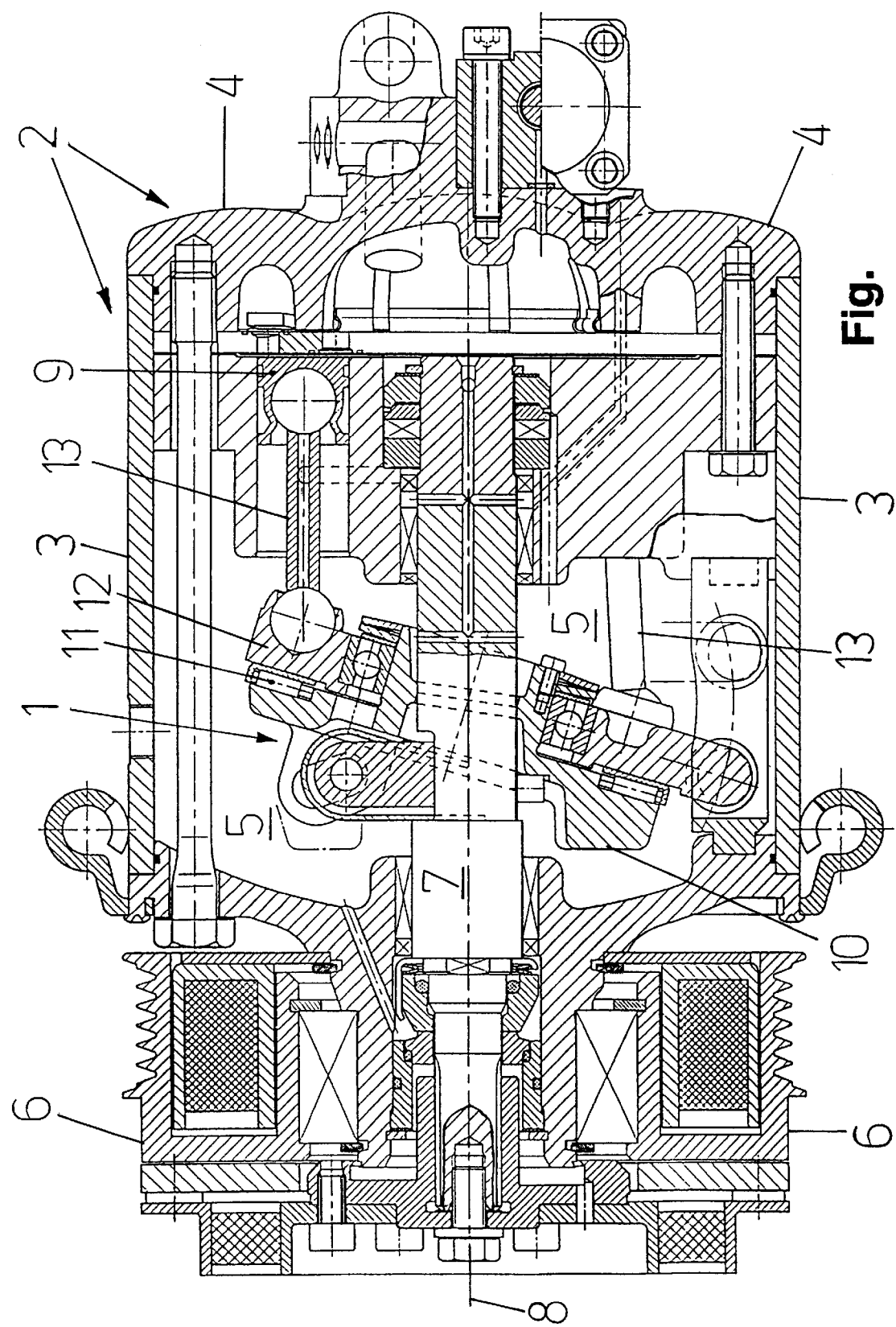

COMPRESSOR FOR AUTOMOTIVE AIR-CONDITIONING SYSTEM

BACKGROUND OF THE INVENTION

The present invention relates to a compressor, especially for the air-conditioning system of a motor vehicle, having a housing and a compressor unit or pump unit arranged in the housing for drawing in and compressing a coolant.

Compressors of the above described type are generally termed air-conditioning compressors and are known in practice in a large variety of forms. Such compressors comprise a housing which includes a compressor unit or pump unit driven from outside. The pump unit which is in the form, for example, of an axial piston pump in turn comprises at least one piston which is movable to and fro in a cylinder block. Generally, such a compressor is equipped with several pistons which, on rotation of a wobble plate, are moved to and fro in the direction of their longitudinal axis by means of a receiving disc, the receiving disc being mounted in a rotationally secure manner in the housing.

Air-conditioning compressors of the most varied design operate with a coolant, the choice of coolant becoming increasingly problematic from an ecological point of view. In any case, the coolant predominantly used at present is R134a but quite considerable ecological doubts are now being raised about that coolant also.

The compressors known in practice and operating with the coolant R134a generally have a housing which is manufactured from aluminum and which, with a maximum bursting pressure of 8 MPa, has wall thicknesses of approximately from 3 mm to 5 mm.

The air-conditioning compressors known from practice are, however, problematic in that there is an increasing requirement for a 100 % environmentally compatible coolant. As purchasers of motor vehicles become increasingly environmentally-aware, that requirement is coming ever more to the fore.

When the air-conditioning compressor is for use in motor vehicles, there is also a requirement, which is likewise increasing, for a smaller structural size. The structural size of known compressors, however, can hardly be further reduced, especially since a specific heating capacity or cooling capacity of the air-conditioning system and therefore a corresponding volumetric displacement or a corresponding mass flow rate of coolant have to be provided for, which in turn requires a minimum structural size.

An object of the present invention is accordingly to provide a compressor that is suitable for use in the air-conditioning system of a motor vehicle and of a structural size which can be reduced compared with compressors previously known, without reducing the compressor capacity. The use of an ecologically harmless coolant is also to be possible.

SUMMARY OF THE INVENTION

The present invention solves the above problem by the provision of a compressor of the type mentioned in the introduction and which is characterized in that the housing is manufactured from a high-strength material and in that a gas that has a high density even in the drawn-in state is used as the coolant.

It has been recognized according to the invention that the coolant is of very special importance not only from the ecological standpoint but also with regard to a reduction in the compressor size because, further according to the invention, it has been recognized that the coolant, with increasing density, even in the drawn-in state, can transport more heat. Therefore, with the same mass flow rate, the gas volume to be transported becomes smaller, whereby the duct cross-sections or the flow paths can in turn be reduced. Consequently, by using such a coolant, it is basically possible to reduce the overall size of the compressor.

When a high-strength material is used for the housing of the compressor, it is readily possible to absorb the high pressures necessary or occurring in the case of a coolant that has a high density even in the drawn-in state. Thus, it is readily possible to accommodate bursting pressures of up to 30 MPa at output temperatures in the range between about 160° C. to 170° C. without having to increase the wall thickness of the compressor housing at the expense of the structural size overall.

Within the scope of an especially simple form of the housing, the housing could be manufactured from a high-strength steel and, as a result, owing to its mechanical properties, the structural space requirement could be reduced by approximately 10% compared with an aluminum housing. In addition, a steel housing can be manufactured at a lower cost than can an aluminum housing, which is attributable to a simpler method of production and a more favorable cost of materials. Furthermore, the lower heat conductivity of steel compared with aluminum leads to an improvement in the efficiency of the compressor because less heat is transferred from the pressure side to the suction side of the compressor housing.

It would likewise be possible, within the scope of an alternative embodiment of the invention, to manufacture the housing from a different high-strength material, such as, for example, from a bronze alloy or from titanium. Other materials are also suitable, although care should always be taken that all the compressor components have approximately the same heat expansion so that temperature-dependent tolerances, such as, for example, temperature dependence of the bearing play or the like, do not occur. It should also be ensured that the heat conductivity is smaller compared with aluminum so that, by that measure alone, the efficiency of the compressor is promoted or improved.

Fiber-reinforced materials or composite materials are also suitable for promoting the high-strength material properties. If fiber-reinforced materials were used, the fibers could be introduced continuously into the material. With a suitable fiber reinforcement and on the basis of a fiber orientation for optimum force absorption, the wall thickness of the housing could once again be very considerably reduced in comparison with conventional materials without such fiber reinforcement.

In principle, the high-strength materials in question here should have a yield point or stretching limit of at least 500 N/mm$^2$ or a breaking limit of at least from 700 N/mm$^2$ to 800 N/mm$^2$. Ideally, the housing material should have a yield point in the range of between 700 N/mm$^2$ and 800 N/mm$^2$, although it must be ensured that the material is still workable. The housing should also be able to withstand extremely high bursting pressures of up to approximately 30 MPa with the smallest possible wall thicknesses.

With regard to manufacturing techniques, especially if a steel housing is taken as a basis, the housing could be manufactured substantially by casting techniques. In principle, it is possible to deep-draw or cold-form and/or hot-form the housing or to manufacture it by cold extrusion. Here, the choice of material is decisive.

Should the high-strength housing prove to be insufficiently oil and gas tight, it could be especially advantageous for the housing to have a thin-walled oil and gas tight inner lining for the housing shell, which comprises high-strength material. The inner lining could in turn be manufactured from aluminum, the mechanical properties of the inner lining being of secondary importance. In this respect, a combination of a high-strength outer housing and an oil and gas tight inner housing would have been provided.

Especially when high-strength steel is used as the housing material, it is also advantageous if measures to prevent corrosion on the external parts or external faces of the housing components are provided. In this respect, corrosion protection, for example in the form of an at least substantially temperature-resistant coating, could be applied directly to the external surface of the housing.

As has been emphasized above, the features of the present invention, namely the use of a high-strength housing material and gas having a high density even in the drawn-in state, are a sophisticated feature combination for the indirect reduction of the structural size or the structural space requirement of the compressor. In this respect, it is especially advantageous for the coolant used to be an inert gas, namely a gas that prevents an undesired reaction of materials in the atmosphere, namely a non-toxic gas. Accordingly, it would also be quite possible for the coolant to be an inert gas mixture, such as, for example, a $CO_2$ containing inert gas mixture.

The inert gas $CO_2$ is especially suitable as the coolant, and this in turn requires high pressures inside the compressor. Unlike conventional coolants, liquification seldom occurs in the high pressure part when $CO_2$ is used. $CO_2$ is available to an almost unlimited extent, is non-toxic, non-combustible and, additionally, does not in any way give rise to residues or damage in the environment.

At a suction pressure of approximately 30 bar, a discharge pressure of over 80 bar could be obtained and, owing to the relatively high density of $CO_2$, an extremely high heating capacity or cooling capacity of the air-conditioning system compared with conventional coolants can be provided while the mass flow rate remains the same. Finally, the volume of the coolant to be transported can be reduced while the capacity remains the same, which leads to a smaller structural size of the compressor at a predetermined capacity requirement.

BRIEF DESCRIPTION OF THE DRAWING

There are various possibilities for modifying and developing the teaching of the present invention in an advantageous manner. In this connection, attention is drawn to the following explanation of an embodiment of the invention with reference to the drawing. In conjunction with the explanation of the preferred embodiment of the invention with reference to the drawing, generally preferred forms and developments of the teaching are also explained.

In the drawing:

The single FIGURE shows an embodiment of a compressor according to the invention in a sectional side view.

DETAILED DESCRIPTION OF THE PREFERRED EMBODIMENT

The embodiment shown purely by way of example in the single FIGURE is an axial piston compressor, the compressor unit 1, which is not described in detail here, being arranged in a housing 2. The housing 2 comprises substantially two housing portions 3, 4, the housing portion 3 forming a so-called drive chamber 5 in which the compressor unit 1 is arranged.

The compressor unit 1 is driven, for example, by an internal combustion engine by means of a belt pulley 6. The drive is effected from there via a drive shaft 7 which rotates about an axis of rotation 8. The drive shaft 7 is rotatably mounted in the housing 2 in the region of the belt pulley 6.

A wobble plate 10 which acts via bearings 11 on a receiving disc 12 mounted in a rotationally secure manner in the housing 2 is provided to drive the pistons 9. The receiving disc 12 is coupled by way of a connecting rod 13 to the piston(s) 9. In accordance with that arrangement, when the wobble plate 10 rotates, the piston 9 moves to and fro in the direction of its longitudinal axis by means of the receiving disc 12, the embodiment shown here comprising several pistons 9.

According to the invention, the housing 2 or the housing portions 3, 4 is/are manufactured from a high-strength material, in this case from high-strength steel. An inert gas, namely $CO_2$, is provided as the coolant. Owing to that combination of features, the structural size of the compressor can be reduced overall, sufficient compressor capacity being ensured in accordance with the details given in the foregoing description.

Finally, it should be emphasized that the embodiment given above purely by way of example merely illustrates the teaching according to the invention and does not limit it to the illustrated embodiment.

That which is claimed is:

1. A compressor adapted for use in an air-conditioning system of a motor vehicle, comprising
   a housing constructed of a material selected from the group consisting of steel, bronze alloy, titanium, a fiber-reinforced material, and a composite material, and wherein said material of said housing has a yield point which is greater than 500 N/mm$^2$,
   a coolant comprising an inert gas selected from the group consisting of $CO_2$ and mixtures containing $CO_2$, and
   a compressor unit arranged in the housing for drawing in and compressing the coolant.

2. The compressor according to claim 1 wherein the compressor unit comprises a rotary shaft rotatably mounted in the housing, a plurality of cylinder bores disposed parallel to and about said rotary shaft, a plurality of pistons mounted to reciprocate within respective ones of the bores, a receiving disc mounted to said shaft by means of a wobble plate so that the receiving disc oscillates upon rotation of the shaft, a plurality of piston rods operatively connected between the receiving disc and respective ones of the pistons, and a drive pulley coaxially connected to the drive shaft.

3. The compressor according to claim 2, wherein the housing material is steel.

4. The compressor according to claim 3, wherein the yield point of the housing material is within the range of between 700 N/mm$^2$ and 800 N/mm$^2$.

5. The compressor according to claim 3, wherein the housing comprises a housing shell of the high-strength material and a thin-walled oil and gas tight inner lining.

6. The compressor according to claim 5, wherein the inner lining is constructed from aluminum.

* * * * *